3,182,079
OPTICAL RESOLUTION OF DL-VALINE
Susumu Tatsumi and Ichiro Sasaji, Kanagawa-ken, and Ko Ohno, Tokyo, Japan, assignors to Ajinomoto Company, Inc., Tokyo, Japan
No Drawing. Filed Nov. 19, 1962, Ser. No. 238,774
5 Claims. (Cl. 260—534)

This invention relates to a process for resolving racemic modifications of optically active compounds, and more particularly, to a process for the resolution of DL-valine.

Amino acids such as valine are generally useful only in the form of the L-isomer, which is the form ordinarily occurring in nature. When such compounds are synthesized by chemical procedure, the products obtained are almost invariably racemates. Chemical and biological methods have been devised for resolving racemates such as DL-valine.

The known methods are not well suited for operations on an industrial scale because they require rather expensive reagents or biological products, and usually involve relatively complex operations.

Accordingly, it is an object of this invention to provide an industrially practical method for resolving DL-valine.

We have found that DL-valine hydrohalide can be successfully resolved by inoculating a saturated or supersaturated solution thereof with crystals of one optically active valine hydrohalide enantiomorph, whereby said enantiomorph is preferentially crystallized from the racemate solution.

It is therefore possible to resolve DL-valine into its substantially pure enantiomorphs by converting the valine to its hydrohalides in any known manner by means of inexpensive reagents and solvents, and by means of simple operations. The optically active valine hydrohalide or optically active valine hydrohalide monohydrate obtained by resolution of the hydrohalide may then be neutralized to yield optically active valine in a manner well understood by those skilled in the art.

We have found that only DL-valine hydrohalides may be successfully resolved into its enantiomorphs, but that the process is not effective for DL-valine or for other DL-valine derivatives such as acyl-derivatives, or salts, such as the copper salt of valine.

In accordance with the present invention, DL-valine is first converted to the hydro-halide thereof which is then resolved into its optically active isomers by inoculating a saturated or supersaturated solution of the DL-valine hydrohalide with crystals of one of the isomers. The isomer is thereby preferentially crystallized. DL-valine is converted to a DL-valine hydrohalide or a hydrate thereof by treating the valine with hydrochloric acid or hydrobromic acid.

DL-valine hydrohalides such as the hydrochloride and hydrobromide crystallize from their aqueous solutions or from solutions containing water in the form of their hydrates. DL-valine hydrochloride, for example, crystallize in the form of its monohydrate. The hydrate releases its water of crystallization gradually at 45–55° C., and quickly at about 100° C. to yield the anhydrous material. The latter is easily converted to the hydrate in the presence of water. Optically active valine hydrohalides share this characteristic behavior with the racemates.

Any solvent in which the valine hydrohalides or their hydrates may be dissolved and from which the hydrohalides may be crystallized in the anhydrous or hydrated form may be employed in the method of this invention. Suitable solvents thus include water, alcohols having one to five carbon atoms, ethanols substituted in the β-position by alkoxyl groups having one or two carbon atoms, ketones and particularly lower alkanones containing water, aqueous solutions of halides in a concentration of not more than 35%, and mixtures of the aforesaid substances.

The saturated or supersaturated solutions of a DL-valine hydrohalide in one of these solvents is inoculated with crystals of one of the optical isomers. The optically active valine hydrohalide hydrates or the anhydrous compounds may be used as seeding crystals. The amount of seeding crystals is at least 0.3% of the weight of the solution.

A supersaturated solution of a mixture of the racemate with an optically active isomer can be used in the method of this invention. In this case the optically active isomer is crystallized spontaneously and preferentially from the solution, and the crystals formed act as seeds on which the optically active isomer is crystallized from the racemate. It is, however, preferred to seed such a mixed solution with the crystals of the optically active isomer in order better to control the resolution process. In this case the amount of seeding crystals may be less than 0.3% of the weight of the solution.

The saturated or supersaturated racemate solutions for our process may be prepared in any known manner, such as by cooling a dilute solution, by evaporating the solvent from a dilute solution, by adding another solvent in which the valine hydrohalide is sparingly soluble or insoluble to a dilute solution of valine hydrohalide in a solvent miscible with said other solvent or by adding common ions to a dilute solution of the hydrohalide.

It is desirable to stir the supersaturated solution during preferential crystallization although this not always necessary.

When the resolution is carried out by cooling a dilute solution, the upper temperature limit is determined by the boiling point of the solution, but the crystallization temperature is preferably at least 20° C. below the boiling point of the solution. The lower limit of the crystallization temperature cannot practically be more than 50° C. below the saturation point of the solution.

When the resolution is carried out by crystallization from a solution supersaturated by means of a second solvent, the dilute solution of a DL-valine hydrohalide may be prepared, for example, with isopropanol or glycol monomethyl ether, and ethyl ether is added as the second solvent to decrease the solubility of the DL-valine hydrohalide in the mixture.

A hydrogen halide or a halide salt may provide the common ion for reducing the solubility of a DL-valine hydrohalide.

It is preferred to interrupt the crystallization of the desired optically active isomer before the crystals amount to about 10% by weight of the solution by separating the crystals from the solution.

The mother liquor contains an optically active amount of the antipode which may then be crystallized from the mother liquor according to our process. The mother liquor is preferably enriched with DL-valine hydrohalide or its hydrate prior to the second crystallization step. Thus, a batch of DL-valine hydrohalide may be completely resolved by seeding a saturated or supersaturated solution of the racemate alternatingly with the two enantiomorphs, crystallizing a portion of the respective enantiomorph, and adding racemic mixture after each crystallization step.

The following examples are further illustrative of the present invention, and it will be understood that the invention is not limited thereto.

*Example 1*

150 grams of an aqueous solution saturated with DL-valine hydrochloride monohydrate at 30° C. were cooled gradually with stirring to 29.5° C., and seeded with 3.0 grams L-valine hydrochloride monohydrate crystals. After seeding, the mixture was further cooled at a rate of 1° C. per 10 minutes. When it reached 25.5° C., the crystals were separated from the main portion of the mother liquor by filtration. The mother liquor adhering to the crystals was absorbed on filter paper on which the crystals were permitted to lie for 3 days. The dried crystals weighed 5.5 g., and their specific rotation was $[\alpha]_D^{20} = +13.24°$ (C=2, H$_2$O). Since the specific rotation of pure L-valine hydrochloride monohydrate is $[\alpha]_D^{20} = +14.24°$ (C=2, H$_2$O), the purity of the crystals, as determined by the optical test, was 93.0%.

5.5 grams DL-valine hydrochloride monohydrate were dissolved in the mother liquor at 45° C. The solution was cooled gradually to 29.5° C., and seeded with 3.0 g. D-valine hydrochloride monohydrate. The mixture was treated as described above to harvest 5.3 g. crystals having a specific rotation $[\alpha]_D^{20} = -14.10°$ (C=2, H$_2$O). The crystals therefore consisted of D-valine hydrochloride monohydrate having an optical purity of 90.0%.

The mother liquor obtained in the second crystallization step was kept at 15° C. with occasional stirring. The crystals formed were separated from the solution and dried at 80° C. for 72 hours without washing. The dried crystals weighed 3.5 g. Their specific rotation was $[\alpha]_D^{20} = +13.06°$ (C=2, H$_2$O). Since the specific rotation of pure L-valine hydrochloride is $[\alpha]_D^{20} = +15.91°$ (C=2, H$_2$O), the crystals recovered from the third crystallization step were L-valine hydrochloride having an optical purity of 82.1%.

*Example 2*

137 grams isopropyl alcohol containing 5.0% water and saturated with DL-valine hydrochloride at 55° C. were cooled gradually with stirring to 53° C., and seeded with 1.7 g. L-valine hydrochloride. The seeded mixture was further cooled at a rate of 3° C. per 10 minutes with stirring for 50 minutes. The crystals were separated from the mother liquor and dried. The crystals weighed 4.0 g. Their specific rotation was $[\alpha]_D^{20} = +13.6°$ (C=2, H$_2$O). The L-valine hydrochloride thus had an optical purity of 85.5%.

The mother liquor was enriched with 4.0 g. DL-valine hydrochloride and subjected to a second crystallization step after seeding with 1.6 g. D-valine hydrochloride in the manner described above. 4.5 grams D-valine hydrochloride having a specific rotation of $[\alpha]_D^{20} = -14.0°$ (C=2, H$_2$O) (optical purity 88.1%) were obtained.

*Example 3*

23 grams DL-valine hydrochloride were completely dissolved in 40 g. ethyleneglycol monomethyl ether at 70°–80° C. The solution was decolorized with activated charcoal, and permitted to stand at room temperature (27° C.) until it was cooled to 45° C. It was then seeded with 0.7 g. L-valine hydrochloride crystals, and stirred for 10 minutes. The crystals were filtered off, briefly washed with ether, and dried. 1.6 g. of valine hydrochloride having an optical purity of 84.9%, $[\alpha]_D^{20} = +13.5°$ (C=2, H$_2$O) were obtained.

*Example 4*

A saturated solution of DL-valine hydrochloride weighing 150 g. and prepared by saturating a 16% aqueous NaCl solution with DL-valine hydrochloride monohydrate at 40° C., was cooled gradually to 39.8° C., and seeded with 2.0 g. L-valine hydrochloride monohydrate. The mixture was further cooled at a rate of 1° C. per 10 minutes with stirring for 25 minutes. The crystals formed were treated as in Example 1, and 4.5 g. L-valine hydrochloride monohydrate having an optical purity of 71%, $[\alpha]_D^{20} = +10.1°$ (C=2, H$_2$O), was obtained.

The mother liquor was kept at 40° C. with occasional stirring, and the crystals formed were filtered, and dried at 80° C. for 72 hours. 3.1 g. D-valine hydrochloride having an optical purity of 68%, $[\alpha]_D^{20} = -10.8°$ (C=2, H$_2$O), was obtained.

*Example 5*

200 grams of a saturated solution of DL-valine hydrochloride were prepared by dissolving DL-valine hydrochloride in 17.5% hydrochloric acid at 54.5° C. 2.0 grams L-valine hydrochloride were dissolved in a small portion of the first solution at 70° C., and the combined solutions were cooled gradually as in Example 1. When the temperature dropped to 51° C., the crystals formed were filtered off, washed with a small amount of isopropyl alcohol, and dried. The weight of the dried crystals was 4.42 g. and their specific rotation $[\alpha]_D^{20} = +11.6°$ (C=2, H$_2$O).

*Example 6*

20 grams DL-valine hydrochloride were completely dissolved in 50 g. ethyleneglycol monomethyl ether at 28° C. and the solution was decolorized by treatment with active charcoal. After seeding with 0.7 g. L-valine hydrochloride, 30 g. ethylether were added drop by drop over a period of 15 minutes. The crystals formed were filtered off, washed with isopropyl alcohol, and dried. The weight of the dried crystals, their specific rotation, and their optical purity were respectively 1.74 g., $[\alpha]_D^{20} = +13.3°$ (C=2, H$_2$O), and 83.6%.

*Example 7*

A solution was prepared from 50 g. isopropyl alcohol containing 4% water by weight and 36 g. DL-valine hydrobromide at 70° C. The solution was cooled to 43° C. and seeded with 1.0 g. L-valine hydrobromide having a specific rotation $[\alpha]_D^{20} = +12.8°$ (C=4, H$_2$O). The resulting mixture was further cooled to 36° C. in 15 minutes with stirring. The crystals were filtered off, washed with a small amount of isopropyl alcohol, and dried. The weight of the dried crystals was 4.25 g., and their specific rotation was $[\alpha]_D^{20} = +7.2°$ (C=4, H$_2$O).

*Example 8*

100 grams DL-valine hydrochloride monohydrate and 3.0 g. L-valine hydrochloride were dissolved completely at 35° C. in 80 g. of a mixture of equal weights of water and methanol. The solution was kept at 10°–15° C. with occasional stirring. The crystals formed were filtered off, washed with a small amount of isopropyl alcohol, and dried at 80° C. for 72 hours. The weight, the specific rotation, and the optical purity of the L-valine hydrochloride obtained in this manner respectively were 5.8 g., $[\alpha]_D^{20} = +11.50°$ (C=2, H$_2$O), and 72.3%.

The mother liquor was kept overnight in a refrigerator. The crystals formed were treated as described in the preceding paragraph. The weight, the specific rotation, and the optical purity of the D-valine hydrochloride recovered were 1.1 g., $[\alpha]_D^{20} = -14.60°$ (C=2, H$_2$O) and 91.8%, respectively.

*Example 9*

100 grams acetone containing 30% water by weight were used as a solvent for 70 g. DL-valine hydrochloride monohydrate at 35° C. The solution was cooled to 26° C., and 3.0 g. L-valine hydrochloride seed crystals were added. The mixture was further cooled to 24.5° C. in 15 minutes with vigorous stirring. The resulting slurry was filtered, and the filtered crystals were dried at 80° C. for 72 hours. The weight, the specific rotation, and the optical purity of the L-valine hydrochloride obtained were 5.2 g., $[\alpha]_D^{20} = +13.50°$ (C=2, H$_2$O), and 84.9%, respectively.

The mother liquor was worked up in the same way as in Example 8, and 1.8 g. crystals of D-valine hydrochloride monohydrate having an optical purity of 89.9%, $[\alpha]_D^{20} = -14.30°$ (C=2, H$_2$O) were obtained.

Example 10

20 grams DL-valine hydrochloride were dissolved in 50 g. isoamyl alcohol containing 5% water by weight at 80° C. The solution was left standing at room temperature until it was cooled to 30° C. 1.5 g. L-valine hydrochloride monohydrate crystals were added to the solution, and the resulting mixture was further cooled to 20° C. in 15 minutes with vigorous stirring. The slurry formed was filtered and the crystals obtained were treated as in Example 8. The weight, specific rotation, and optical purity of the L-valine hydrochloride so prepared were 4.9 g., $[\alpha]_D^{20}=+14.40°$ (C=2, $H_2O$), and 90.5%, respectively.

2.1 grams crystals of D-valine hydrochloride were obtained from the mother liquor in the same way as in Example 8. The specific rotation and the optical purity of the crystals were $[\alpha]_D^{20}=-14.15°$ (C=2, $H_2O$) and 88.9%, respectively.

It will be appreciated that the several DL-valine hydrohalides resolved in Examples 1 to 10 are prepared from equimolecular amounts of DL-valine and the corresponding hydrogen halide in a conventional manner, for example, by crystallizing DL-valine hydrochloride from an aqueous solution of DL-valine and hydrochloric acid. The optically active enantiomorphs of valine are obtained from the corresponding hydrochlorides or hydrobromides prepared as set forth in Examples 1 to 10 by dissolving the crystals of the optically active hydrohalide in water, and passing the aqueous solution through an ion exchange column containing a basic ion exchange resin which retains the hydrochloric or hydrobromic acid and discharges a solution of optically active valine. The amino acid is then separated from the solution by evaporation of the water in a vacuum. Many other methods of converting valine into its hydrohalides, and for converting hydrohalides into valine are well known to those skilled in this art, and may be employed interchangeably in the process of our invention without departing from the scope and spirit thereof.

The temperature at which preferential crystallization of a desired enantiomorph takes place is not in itself of critical importance, and will be selected to suit the concentration of solutes in the solution which must at least be saturated with respect to the desired optically active enantiomorph. Since the racemate present reduces the solubility of the optically active isomers, the ratio of racemate to optically active isomer in the saturated or supersaturated solution may vary widely. If seeding with added crystals of optically active material is resorted to, an initial excess of one optically active enantiomorph in the saturated or supersaturated solution will not be required so that the solution initially will be at least saturated with respect to both enantiomorphs.

The solvent or solvents in the saturated or supersaturated solution are not directly relevant to the process of our invention although solvents capable of retaining substantial amounts of valine hydrohalides will be preferred for economical reasons. Many liquids other than those specifically identified in the examples may therefore be employed, and will modify the process only to the extent that their ability to dissolve valine hydrohalides may differ. Glycol ethers other than the monomethyl ether are entirely suitable, and the monoethyl ether of glycol (beta-ethoxyethanol) is typical of such glycol ethers. Although acetone is a better valine hydrohalide solvent than most of its higher homologs, methyl ethyl ketone, and the pentanones may be substituted for acetone in the process illustrated by Example 9 without basically affecting the process or its results.

It is therefore to be understood that within the scope of the appended claims, the invention may be practiced otherwise than as specifically disclosed.

What we claim is:
1. A process for resolving a DL-valine hydrohalide into the optically active enantiomorphs thereof which comprises:
   (a) preparing a solution of said DL-valine hydrohalide from an amount of said DL-valine hydrohalide sufficient to at least saturate said solution with respect to said DL-valine hydrohalide, and a liquid selected from the group consisting of water, an alkanol having one to five carbon atoms, a beta-alkoxyethanol having one to two carbon atoms in the alkoxy group, a lower alkanone, an aqueous solution of halide ions, and mixtures of said liquids;
   (b) contacting said solution with seed crystals of one optically active enantiomorph of said valine hydrohalide;
   (c) permitting said one enantiomorph to preferentially crystallize from said solution in the presence of said seed crystals; and
   (d) separating the crystals of the optically active enantiomorph of said valine hydrohalide from the remainder of said solution.
2. A process as set forth in claim 1, wherein said valine hydrohalide is a member of the group consisting of valine hydrochloride and valine hydrobromide.
3. A process as set forth in claim 1, wherein said solution is supersaturated with respect to said DL-valine hydrohalide.
4. A process for resolving a DL-valine hydrohalide into the optically active enantiomorphs thereof which comprises:
   (a) preparing a solution of said DL-valine hydrohalide and of one optically active enantiomorph thereof in a solvent selected from the group consisting of water, an alkanol having one to five carbon atoms, a beta-alkoxyethanol having one to two carbon atoms in the alkoxy group, a lower alkanone, an aqueous solution of halide ions, and mixtures of said solvents, said solution being at least saturated with respect to said DL-valine hydrohalide and supersaturated with respect to said one enantiomorph;
   (b) permitting at least a portion of said one enantiomorph spontaneously to crystallize from said solution to form seed crystals;
   (c) permitting crystallization of the corresponding enantiomorph from said DL-valine hydrohalide on said seed crystals; and
   (d) separating the crystals so formed from the remainder of said solution.
5. A process as set forth in claim 4, wherein said valine hydrohalide is a member of the group consisting of valine hydrochloride and valine hydrobromide.

References Cited by the Examiner

UNITED STATES PATENTS 2,898,358   8/59   Dowling.
2,940,998   6/60   Ogawa.

LORRAINE A. WEINBERGER, *Primary Examiner.*

LEON ZITVER, *Examiner.*